(12) United States Patent
Willshire et al.

(10) Patent No.: US 11,451,463 B2
(45) Date of Patent: *Sep. 20, 2022

(54) SYSTEM AND METHOD FOR INTERACTIVITY TESTING OF TEXT-BASED CUSTOMER COMMUNICATIONS

(71) Applicant: Cyara Solutions Pty Ltd, Hawthorn (AU)

(72) Inventors: Geoff Willshire, Greenslopes (AU); Gavin Sansom, Lisarow (AU)

(73) Assignee: CYARA SOLUTIONS PTY LTD, Hawthorn Vic (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,770

(22) Filed: Mar. 30, 2021

(65) Prior Publication Data
US 2021/0328901 A1    Oct. 21, 2021

Related U.S. Application Data

(63) Continuation of application No. 16/502,814, filed on Jul. 3, 2019, now Pat. No. 10,965,579, which is a continuation-in-part of application No. 16/389,929, filed on Apr. 20, 2019, now abandoned, which is a continuation of application No. 15/374,076, filed on Dec. 9, 2016, now abandoned.

(51) Int. Cl.
| | |
|---|---|
| *H04L 43/50* | (2022.01) |
| *H04L 51/04* | (2022.01) |
| *H04L 41/22* | (2022.01) |
| *G06F 11/36* | (2006.01) |

(52) U.S. Cl.
CPC .......... *H04L 43/50* (2013.01); *G06F 11/3672* (2013.01); *H04L 41/22* (2013.01); *H04L 51/04* (2013.01)

(58) Field of Classification Search
CPC ...... G06F 11/3672; H04L 43/50; H04L 51/04; H04L 41/22; H04L 29/08072
See application file for complete search history.

(56) References Cited

U.S. PATENT DOCUMENTS

| | | | |
|---|---|---|---|
| 7,023,979 B1 | 4/2006 | Wu et al. | |
| 7,698,400 B1 * | 4/2010 | Beloussov | H04L 41/0246 709/229 |
| 8,924,269 B2 | 12/2014 | Seubert et al. | |
| 9,253,663 B2 | 2/2016 | Raleigh et al. | |
| 10,095,878 B2 * | 10/2018 | Goldfarb | H04L 43/04 |
| 10,129,168 B2 | 11/2018 | Kaminski et al. | |
| 10,251,120 B2 | 4/2019 | Ketonen et al. | |
| 10,375,591 B2 | 8/2019 | Ketonen et al. | |
| 10,699,026 B2 * | 6/2020 | Goldfarb | H04L 63/10 |
| 10,965,579 B2 * | 3/2021 | Willshire | H04L 41/22 |

(Continued)

FOREIGN PATENT DOCUMENTS

AU    2009212942 A1 *  3/2010  ............. G06Q 10/06

*Primary Examiner* — Khanh Q Dinh
(74) *Attorney, Agent, or Firm* — Galvin Patent Law LLC; Brian R. Galvin

(57) ABSTRACT

A system and method for interactivity testing of text-based customer communications which allows for interactivity testing of different forms of text-based communications with a contact center including two-factor authentication testing, multi-modal communication testing, and load testing.

6 Claims, 13 Drawing Sheets

(56) References Cited

U.S. PATENT DOCUMENTS

| | | |
|---|---|---|
| 2012/0330869 A1 | 12/2012 | Durham |
| 2016/0124920 A1 | 5/2016 | Golay |
| 2017/0063614 A1* | 3/2017 | Hartwig .............. H04L 41/0883 |
| 2019/0018975 A1* | 1/2019 | Goldfarb ................. H04L 63/20 |
| 2020/0036620 A1* | 1/2020 | Willshire ............ G06F 11/3684 |
| 2020/0279051 A1* | 9/2020 | Goldfarb ............... H04L 41/069 |
| 2020/0311699 A1* | 10/2020 | Ranjit .............. G06Q 20/38215 |
| 2021/0032899 A1* | 2/2021 | Taylor ................. E04H 17/1447 |

* cited by examiner

SYSTEM AND METHOD FOR INTERACTIVITY TESTING OF TEXT-BASED CUSTOMER COMMUNICATIONS

BACKGROUND OF THE INVENTION

Field of the Art

The disclosure relates to the field of contact center operations, and more particularly to the field of testing for methods for text communication systems.

Discussion of the State of the Art

In the field of contact center operations, more centers are beginning to accommodate additional, text-based communications commonly found in the art such as email, SMS interactions including two-factor authentication, and tertiary text messaging such as automated online messaging, to better serve customers who may not have access to or desire to utilize a voice connection.

There exist in the art testing methods for individual text-based communications, but no system for integrated testing of all currently used customer-to-business text communications exists. Furthermore, while there are some testing systems implemented in the art currently, such systems require the interaction of a testing agent to operate, which introduces new problems such as additional expense for the time and labor involved in testing, human error factor which may influence reliability of testing protocols, and various inconsistencies associated with human operation. Lastly, no automated testing method exists which may test interactivity and integration of these different text communication methods, such as responding to an SMS message with an email or vice versa, to ensure that a business' automated communications with a potential customer meet or exceed requirements and expectations, including load testing to ensure that large quantities of customer queries may be adequately responded to.

What is needed is a flexible and scalable automated testing solution for text-based communications, that utilizes test cases to configure and execute response and load testing of message sending and receipt, and that produces meaningful test reports for review.

SUMMARY OF THE INVENTION

Accordingly, the inventor has conceived and reduced to practice, in a preferred embodiment of the invention, a system and method for interactivity testing of text-based customer communications.

The invention comprises a system that enables automated interactivity testing of text-based customer communications that bundles multiple configuration parameters and settings into a "test case," enabling convenient storage and retrieval of testing configuration without having to re-enter information and without the risk of losing any details. The invention also provides a method for case-based email testing that enables time- and interval-based testing using stored test cases, and that compares received email message information against test case configuration to examine the results of operation and determine whether received messages match expected results.

According to a preferred embodiment, a system for interactivity testing of text-based contact center communications is disclosed, comprising: a test database configured to store testing information comprising: one or more text-based communication queries each comprising text simulating a query from a customer to a contact center; and one or more test configurations comprising instructions as to which forms of text-based communication are supported at a contact center; and an interactivity testing engine comprising a plurality of programming instructions stored in the memory of, and operating on a processor of, a computing device, wherein the programming instructions, when operating on the processor, cause the computing device to: retrieve a test configuration and a query from the test database for the contact center; send the query from the test configuration to the contact center in each form of text-based communication supported by the contact center; receive a response from the contact center for each query sent in the same form of text-based communication as the query; compare each query and its response using one or more parameters to determine whether the response was appropriate to the query; and report an outcome of each comparison.

According to another preferred embodiment, a system for interactivity testing of multi-modal text-based contact center communications is disclosed, comprising: a test database configured to store testing information comprising: one or more text-based communication queries each comprising text simulating a query from a customer to a contact center; and one or more test configurations comprising instructions as to which forms of text-based communication are supported at a contact center; and an interactivity testing engine comprising a plurality of programming instructions stored in the memory of, and operating on a processor of, a computing device, wherein the programming instructions, when operating on the processor, cause the computing device to: retrieve a test configuration and a query from the test database for the contact center; send the query from the test configuration to the contact center in each form of text-based communication supported by the contact center; receive a response from the contact center for each query sent in a different form of text-based communication as the query; compare each query and its response using one or more parameters to determine whether the response was appropriate to the query; and report an outcome of each comparison.

According to another preferred embodiment, a system for interactivity testing of two-factor authentication in text-based contact center communications, comprising: a test database configured to store testing information comprising: one or more text-based communication queries each comprising text simulating a query from a customer to a contact center; and one or more test configurations comprising instructions as to which forms of text-based communication are supported at a contact center; and an interactivity testing engine comprising a plurality of programming instructions stored in the memory of, and operating on a processor of, a computing device, wherein the programming instructions, when operating on the processor, cause the computing device to: retrieve a test configuration and a query from the test database for the contact center; send the query from the test configuration to the contact center in each form of text-based communication supported by the contact center; receive a response from the contact center for each query in a different form of text-based communication from the form of text-based communication of the query, the response comprising an authentication code; extract the authentication code from the response; enter the authentication code in a text-based field at an authentication code prompt on a first web page; determine whether the login was successful by scanning the contents of a second web page that appears after entering the authentication code on the first web page; and report an outcome of the determination of whether the login was successful.

According to an aspect of an embodiment, the test database and interactivity testing engine are on separate computing devices, communicating over a network.

According to an aspect of an embodiment, the test database and interactivity testing engine are co-located on the same computing device.

According to an aspect of an embodiment, the system further comprises a load testing engine comprising a further plurality of programming instructions stored in the memory of, and operating on a processor of, the computing device, wherein the programming instructions, when operating on the processor, cause the computing device to: send large quantities of a query from the test configuration to the contact center in each form of text-based communication supported by the contact center; receive responses from the contact center for each query sent in the same form of text-based communication as the query; analyze and determine the performance and speed with which responses are sent from the contact center under large or increasing loads; and provide a result of the analysis.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
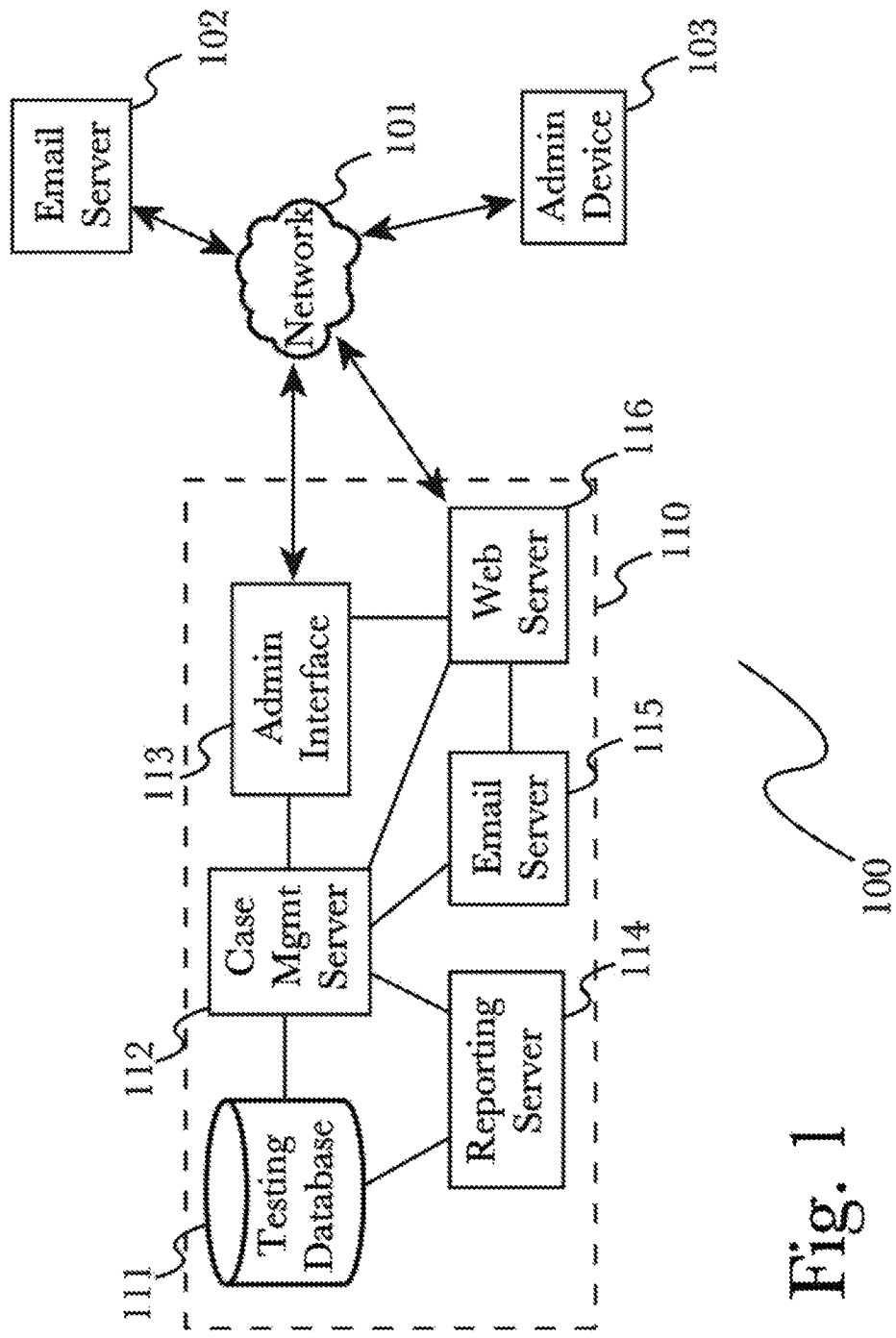
FIG. 1 is a block diagram illustrating an exemplary system architecture for case-based automated email testing, according to a preferred embodiment of the invention.

The inventor has conceived, and reduced to practice, in a preferred embodiment of the invention, a system and method for interactivity testing of text-based customer communications.

In the field of contact center operations, more centers are beginning to accommodate additional, text-based communications forms such as email, SMS interactions including two-factor authentication, and tertiary text messaging such as automated online messaging, to better serve customers who may not have access to or desire to utilize a voice connection. A common example of this would be a customer browsing through an online catalog on a company's website. In such a scenario, a customer might have a question about a product, and may send an email to a customer service account, allowing customers to communicate directly with agents while still browsing the online catalog and from the convenience of their computer. As well, the customer might be able to interact with an automated help chatbot that can parse and respond to basic queries, and some systems allow a user to send SMS messages to certain numbers for uses including product information links, callback scheduling, and two-factor authentication. This allows for convenient, speedy, and flexible communications, such as a customer who may be viewing an online catalog from an Internet café or similar public location, where they may not have access to a telephone or may not desire for their conversations to be overheard by others.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for case-based automated email testing, according to a preferred embodiment of the invention. According to the embodiment, a case-based email testing system 110 may comprise a testing database 111 that stores and provides case- and test-related information such as test case configuration and execution results, a case management server 112 that creates, stores, retrieves, and executes test cases, and that operates an administration interface 113 that comprises an interactive interface for configuring and directing email test cases via a network 101, for example from an administrator's computing device 103 such as a personal computer or mobile device. In this manner, an administrator may configure and execute test cases remotely and may monitor the operation or results of test case execution. Test case configuration may comprise a variety of email information such as (for example) including text information for message fields (such as the "subject" and "body" fields commonly used in email messages), "to" and "from" email addresses that may be used to verify the operation of specific email addresses or the routing of messages to and from those addresses, specific email server information such as a server to be used for sending a message or a server to be targeted for message receipt, network information such as specific connections, addresses, or bandwidth to be used during test case execution, timing information such as a specific minimum or maximum time to respond to a request or for overall execution of a test case or a "pulse" interval to determine test execution frequency and timing, or other message, system, or case-specific information. In this manner, the configuration and execution of a test case may be managed as precisely as needed to adequately test the desired features or components, and may be stored and retrieved as a complete test case for future use without having to repeat configuration and without the risk of any details being lost.

A reporting server 114 may be used to monitor test case execution and produce reports from execution results, for example including email message fields (such as sender address, recipient addresses, header, body, and other email data fields), test case execution time (for example, tracking min/max time thresholds during test execution), what email systems were tested, or other data that may be useful for future review. Test case reports may be stored in testing database 111 and presented for review via an administration interface 113. Email server 115 may be used to send and receive email messages as directed by case management server 112, and may optionally be the same email server used in contact center operations (that is, the email server responsible for sending and receiving messages between agents and customers) or may be a separate email server used for testing purposes, such as to test the effects of a particular server or message configuration prior to implementing the configuration on production systems. Plurality of network servers 116 may operate an interactive interface accessible using a web browser application via network 101, for example to present test case reports or an administration interface 113.

According to some arrangements, more than one email server may be utilized, such as (for example) to send an email message from email server 115 to an external email server 102 operated by a remote host such as an email service provider or a private email server (for example, operated by an administrator or other user), as well as to enable the testing of multiple email servers for redundancy, as is often utilized in corporate environments to prevent downtime should any single email server experience difficulties.

Figure 8:
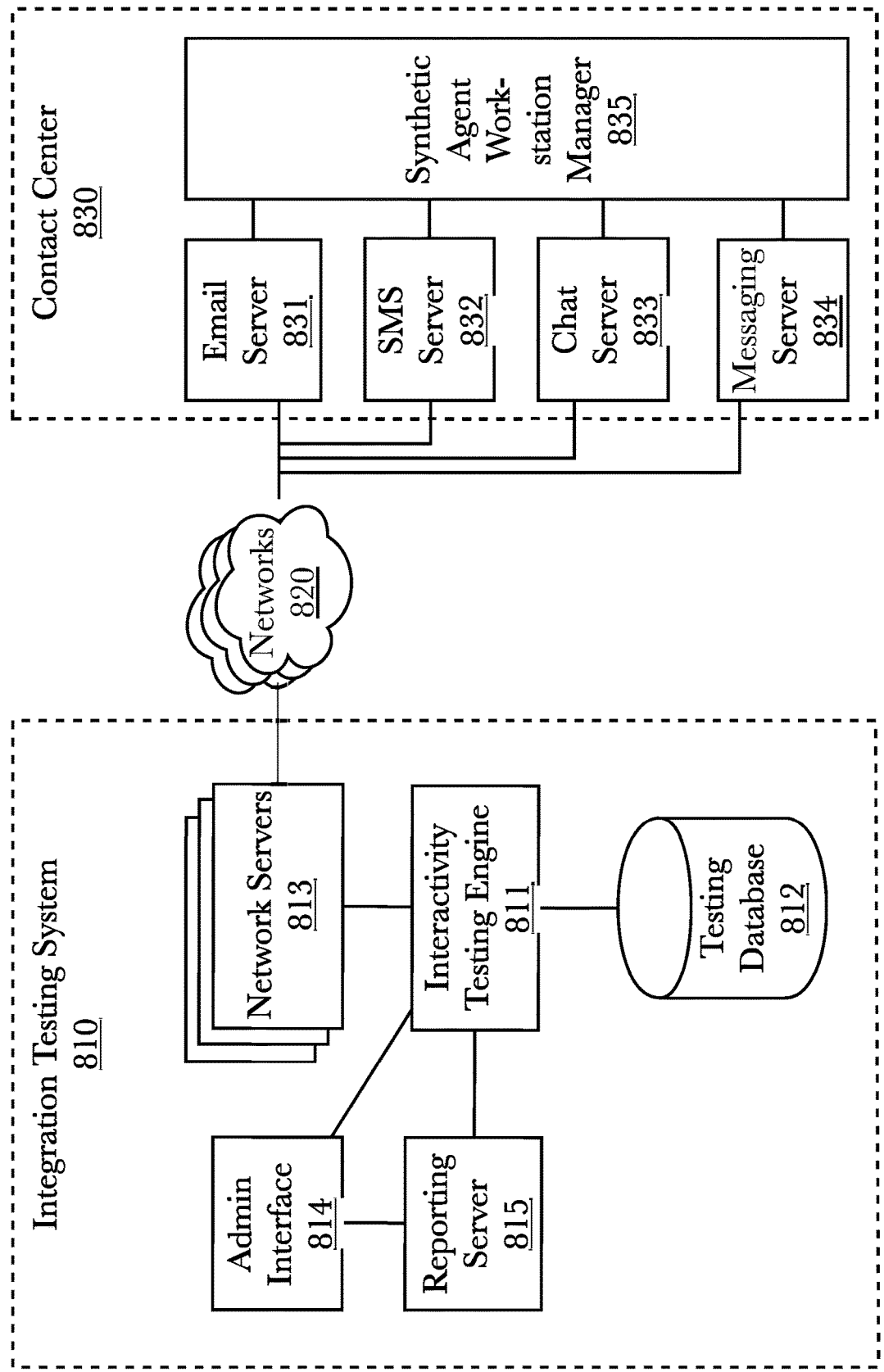
FIG. 8 is a diagram of an exemplary text-based communication interactivity testing system utilizing email, SMS, and messaging services.

FIG. 8 is a diagram of an exemplary text-based communication interactivity testing system for interactivity testing of email, SMS, chats, and messaging services. An integration testing system 810 exists which contains several components, namely an interactivity testing engine 811, a testing database 812, a plurality of network servers 813, an administrative interface 814, and a reporting server 815. The integration testing system 810 communicates across a plurality of networks 820 with a contact center 830, which has a variety of servers for various modes of communication, for example, an email server 831, an SMS server 832, a chat server 833, and a messaging server 834. The particular network of the plurality of networks 820 through which a given communication will occur will depend on the type of communication being sent (e.g., typically the Internet for email communications, a cellular telephone network for SMS communications, etc.). A synthetic agent workstation manager 835 is installed at the contact center 830 to receive and respond to communications sent by the integration testing system 810 to the contact center 830 through the various modes of communication. Communications are either tagged by the integration testing system 810 for routing to the synthetic agent workstation manager 835, or rules are set up at each of the various servers of the contact center 830 to route messages received from the integration testing system 810 to the synthetic agent workstation manager 835. The synthetic agent workstation manager 835 operates a plurality of virtual agent workstations which are configured to receive communications of a given type and provide context-appropriate responses, which are sent back to the integration testing system 810 for analysis. Further, in some embodiments, the synthetic agent workstation manager 835 can initiate communications from the contact center 830 without first receiving communications from the integration testing system 810. An integration testing system 810 specifically communicates over a network 820 with a contact center 830 by sending textual communications, such as emails, SMS text messages, or other forms of text messages such as online chats or third-party messaging system formats, and listening for a response message from the contact center 830. A plurality of network servers 813 act as interfaces between the network of the plurality of networks 820 and the rest of the integration testing system 810, relaying these messages to and from an interactivity testing engine 811, which is responsible for the final creation of the outgoing messages, processing of incoming responses, and communicating with other components in an integration testing system 810. A testing database 812 exists in the integration testing system 810 which may be queried by an interactivity testing engine 811 to provide templates of messages in various forms which may be used by an interactivity testing engine 811 for forming an outgoing message, or for comparison with a received response to determine if the response matches the expected template. A reporting server 815 communicates with an administrative interface 814 and an interactivity testing engine 811 to receive, store, format, and potentially analyze reports on performance by an interactivity testing engine 811, such as errors in the function of the testing engine, or when a received response from a contact center 830 is either delayed, missing, or not formatted appropriately compared to what the template indicates. An administrative interface 814 communicates with both the reporting server 815 and the interactivity testing engine 811, querying reports from a reporting server 815 to allow a user to view them, while also allowing a user of the interface 814 to interact with the interactivity testing engine 811, allowing them to view the progress of current ongoing tests, manually alter tests, set new tests to begin if necessary, pause ongoing tests, and any other administrative task that may be required for the operation of the testing engine 811.

Figure 9:
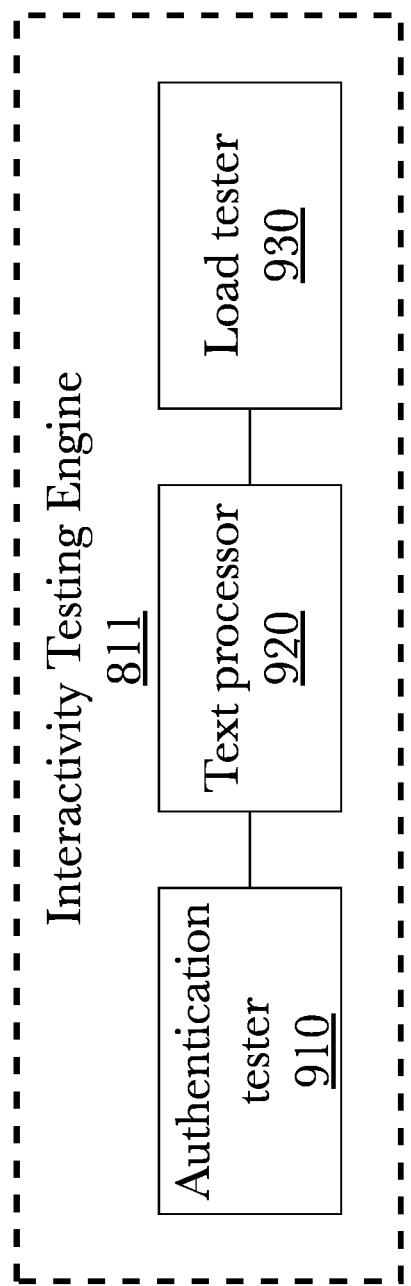
FIG. 9 is a diagram of a interactivity testing engine as used in a text-based communication interactivity testing system.

FIG. 9 is a diagram of a interactivity testing engine as used in a text-based communication interactivity testing system. An interactivity testing engine interactivity testing engine 811 at least comprises internal components including an authentication tester 910, text processor 920, and a load tester 930. A text processor is a component capable of automatically interpreting communications test configurations from a database, receiving any text-based communications or files, and applying data processing techniques such as regular expressions, heuristic text analysis, and other software techniques for analyzing textual data. An authentication tester 910 may be specially designed to analyze any received messages for authentication codes sent in two-factor authentication techniques, and may process such authentication by communicating with a plurality of network servers to access a web page where the authentication code must be entered, or forming a response to a communication in a form noted by a testing database, and sending said communication to a contact center's textual communication provider. The purpose of such authentication testing is to ensure that when a contact center provides a user with two-factor authentication options, these automated authentication options function as-expected and in a secure fashion, as reported by an authentication tester 910. A load tester 930 is responsible for generating load-testing messages, whether email, SMS, or some other messaging format, determining the amount and frequency of these messages to be sent to a contact center, and analyzing any results including response time, response quality, errors in responses, any associated drops in response time during peak load times, and associated load balancing tasks.

DETAILED DESCRIPTION OF EXEMPLARY EMBODIMENTS

Figure 2:
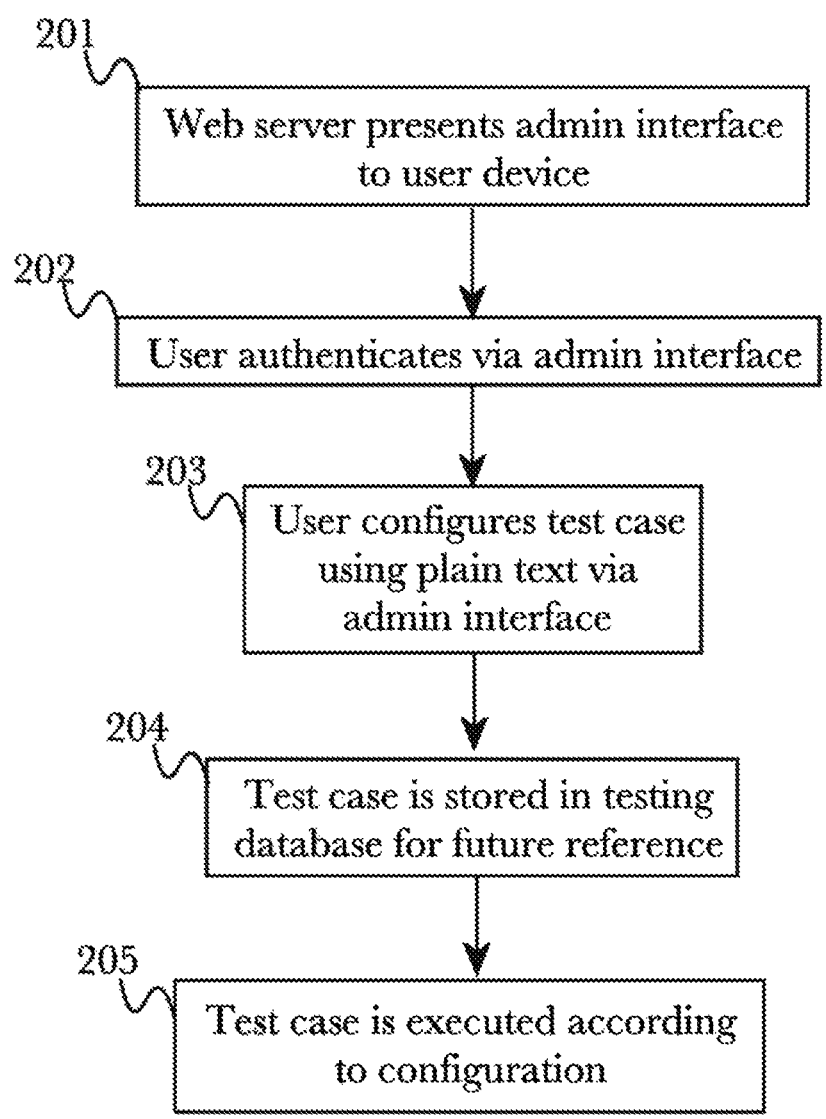
FIG. 2 is a flow diagram illustrating an exemplary method for creating and saving an email test case, according to a preferred embodiment of the invention.

FIG. 2 is a flow diagram illustrating an exemplary method 200 for creating and saving an email test case, according to a preferred embodiment of the invention. In an initial step 201, a user may access an administration interface 113 via their device (for example, using a web browser on a personal computer or mobile device), and may authenticate in a next step 202 so they can interact as an administrator. In a next step 203, the authenticated user may configure a new test case using plain text, facilitating an easy-to-use means for designing email test cases without the need for specialized training or advanced programming knowledge. For example, administration interface 113 may present a number of prompts or fields to configure specific features of an email test case, such as to fill out "to" and "from" fields for messages sent during execution, or to configure monitoring or reporting settings for a reporting server 114 to track execution of the test case. In a next case 204, the user may save the new test case and it is stored in testing database 111 for future reference, and in a next step 205 the saved test case may be retrieved and executed according to the configuration (for example, if the test case is configured to execute at a specific time or in response to a trigger such as a change in email server 115 configuration, as well as time-based execution parameters such as using response time thresholds to determine the success or failure of a test step). In some arrangements, a user may be able to manually execute a test case, such as for one-time testing of a specific feature or configuration.

Figure 3:
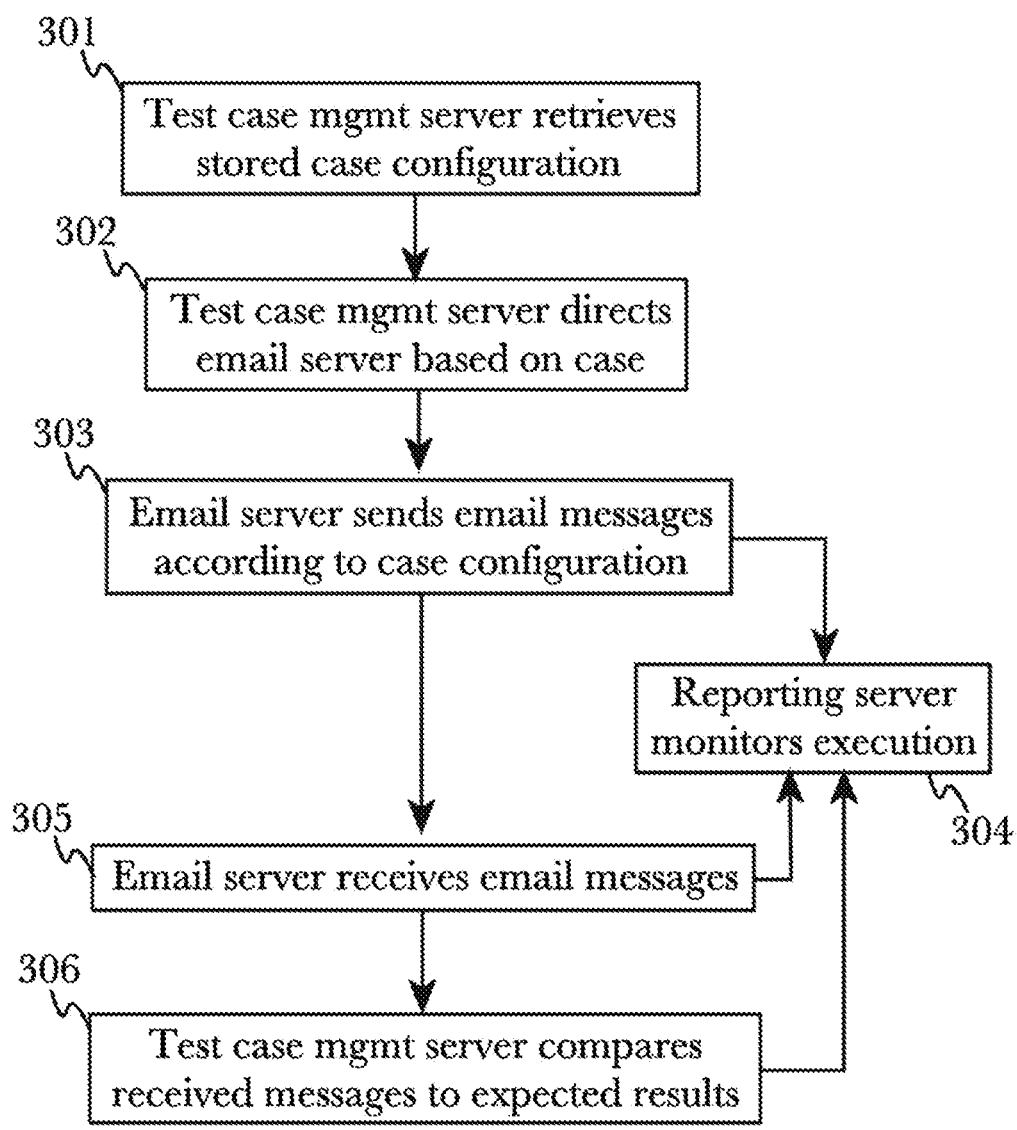
FIG. 3 is a flow diagram illustrating an exemplary method for case-based email testing, according to a preferred embodiment of the invention.

FIG. 3 is a flow diagram illustrating an exemplary method 300 for case-based email testing, according to a preferred embodiment of the invention. In an initial step 301, a test case management server 112 may retrieve a stored test case configuration for execution from a testing database 111, for example configured synthetic email information for generating emails during testing, or stored testing parameters. In next step 302, test case management server 112 may direct a plurality of email servers 115 based on the loaded case configuration, for example to send email messages with specific information or configuration, such as using specific email addresses or servers for sending or to check specific email servers or addresses for receipt. In a next step 303, an email server 115 may send a plurality of email messages according to the loaded case configuration, and operation may be monitored and logged by a reporting server 114 in a reporting step 304. In this manner, a number of synthetic emails may be produced and sent via standard communication channels during testing, wherein synthetic emails are sent for normal handling wherein they may be received at the destination, where they may then be classified and routed according to the destination's handling configuration. Synthetic emails may be routed separately from actual customer interaction emails, for example to be sent to synthetic agent workstations that may then perform automated handling and response according to configured test execution information. In a next step 305, an email server 115 may receive a plurality of email messages (optionally messages sent as part of a test case, or messages received that were not generated by a test case, for example to test receipt-only functionality using incoming email messages), and received messages may be provided 306 to test case management server 112 and compared against anticipated results according to the loaded test case configuration. For example, if email messages are received that were sent according to a test case configuration, specific message information may be anticipated such as "to" and "from" fields or text content within various information fields of the message, and when a message is received it may be compared against this predicted result to examine the execution of the test case and the operation of systems used during execution. Additionally, this comparison may be used to determine if a particular email message is part of a test case, and if so which specific test case as multiple test cases may be executed or pending during a given span of time. Reporting server 114 may continue to monitor and log operation 304 and produce a report for a test case or a system that was tested, that may then be stored for future reference. For example, multiple test cases with varying configurations may be executed to thoroughly test a particular email server or network connection, and the execution of these test cases may be logged as a testing report on the operation of the system(s) in question, optionally in addition to a plurality of testing reports for the specific test cases that were executed. In this manner, email testing comprises an end-to-end testing operation that comprises each step of an email interaction from the creation of an initial email, through each step of email routing and handling, and a response from the destination.

Figure 10:
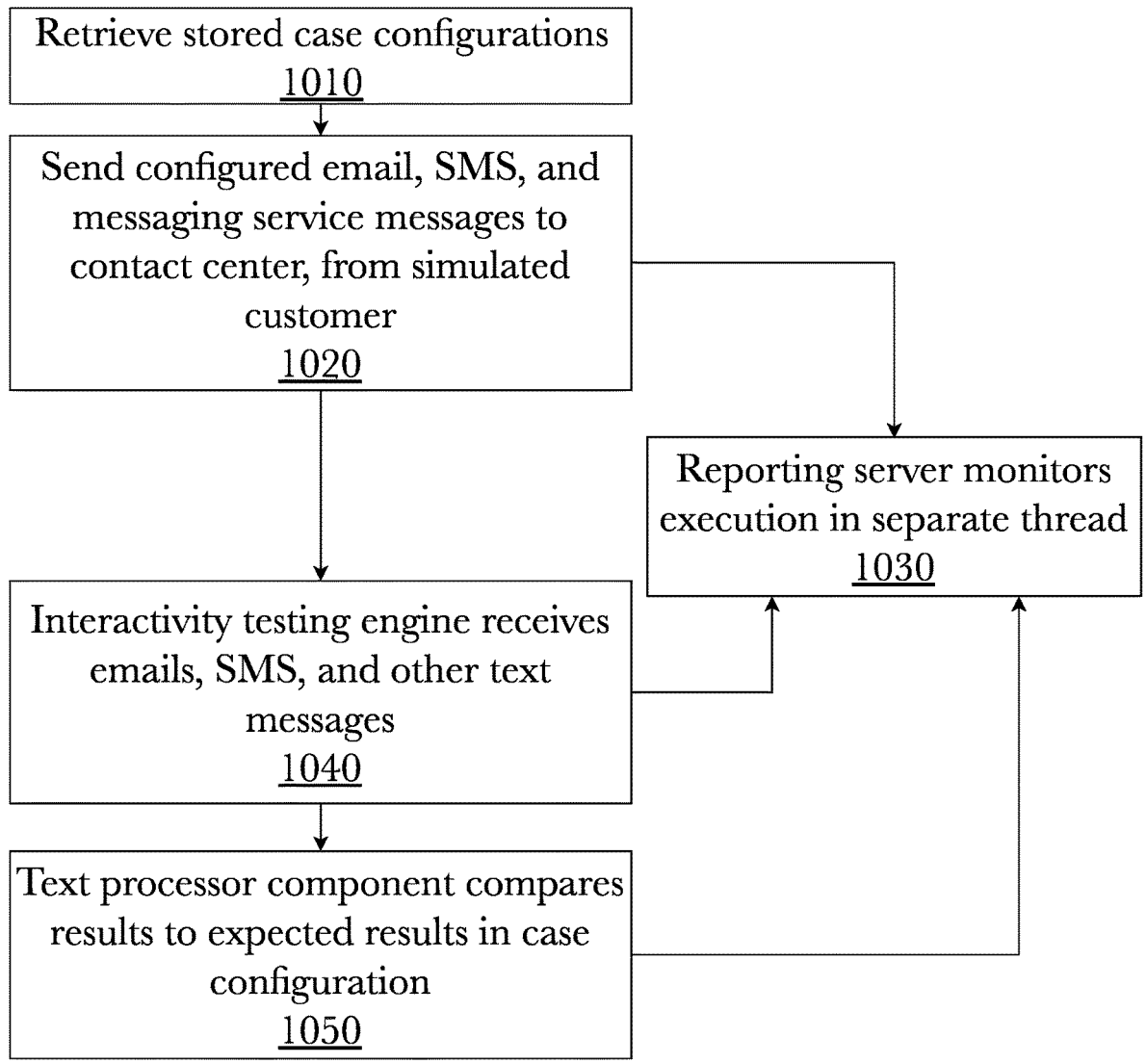
FIG. 10 is a method diagram for combined text communications testing including email, SMS, and messaging testing of a contact center's automated responses.

FIG. 10 is a method diagram for combined text communications testing including email, SMS, and messaging testing of a contact center's automated responses. Stored case configurations must first be retrieved if they are available 1010, from a testing database 812, by a text processor 920 component of a interactivity testing engine 811. Such testing configurations represent forms of text-based communications that are known and able to be automatically tested with, for example specific email or SMS forms which may be analyzed for specific contents if their general configuration is known, for processing and formulating automatic replies to test a contact center's system 1020. In this embodiment, the initial message to a contact center and the response from the contact center, are in the same form of text-based communication, either email, SMS, or some other messaging form such as online chat messages or a messaging service such as WhatsApp. After an initial message is sent to a contact center 1020, response messages may be received from the contact center by a interactivity testing engine 811, 1040, after which a text processor 920 compares the received response to the expected response as stored in the testing database 1050, 812. Continuously after sending an initial communication to a contact center 1020 and at every progressive step in the method, a reporting server 815 monitors the execution and progress of the integration testing 1030, reporting to an administrative interface 814 any software errors, errors in the testing itself, errors in received responses from a contact center, or even successful testing results and the configurations used in such tests, for a human user to examine if necessary.

Figure 11:
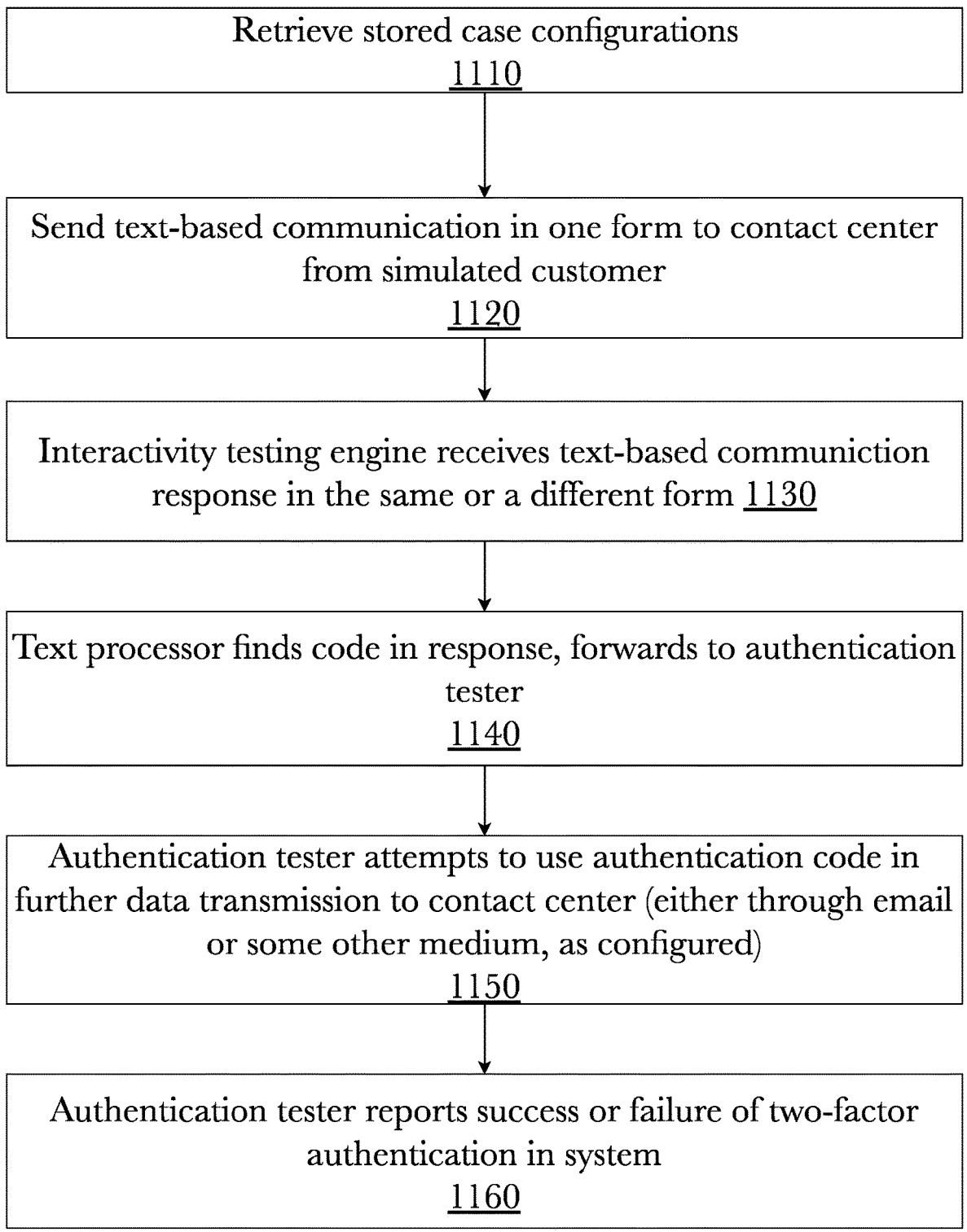
FIG. 11 is a method diagram for testing a contact center's automated responses using two-factor authentication.

FIG. 11 is a method diagram for testing a contact center's automated responses using two-factor authentication. Stored case configurations must first be retrieved if they are available 1110, from a testing database 812, by a text processor 920 component of a interactivity testing engine 811. Such testing configurations represent forms of text-based communications that are known and able to be automatically tested with, for example specific email or SMS forms which may be analyzed for specific contents if their general configuration is known, for processing and formulating automatic replies to test a contact center's system 1120. In this embodiment, the initial message to a contact center is in one form of text-based communication, and the response from the contact center is either in the same form or in a different form from the initial message, either email, SMS, or some other messaging form such as online chat messages or a messaging service such as WhatsApp. After an initial message is sent to a contact center 1120, response messages may be received from the contact center by a interactivity testing engine 811, 1130, after which a text processor 920 finds an authentication code typically sent by SMS message 1140, at which point the message and authentication code may be sent to an authentication tester 910, 1140. Upon an authentication tester 910 receiving a message with an authentication code for two-factor authentication requests, it may attempt to use the authentication code in whatever manner is configured according to a testing database 812, 1150, such as sending the code in a message, SMS, or email response, or sending web data to fill out an online form with the code through some API or POST request, attempting to automate the process of a user filling out a form in a web-browser and submitting the code for authentication. The authentication tester will then analyze whatever response is given by the contact center according to the loaded configuration, and report either a success or failure of the attempted two-factor authentication request 1160, which may be sent to a reporting server 815 for viewing in an administrative interface 814.

Figure 12:
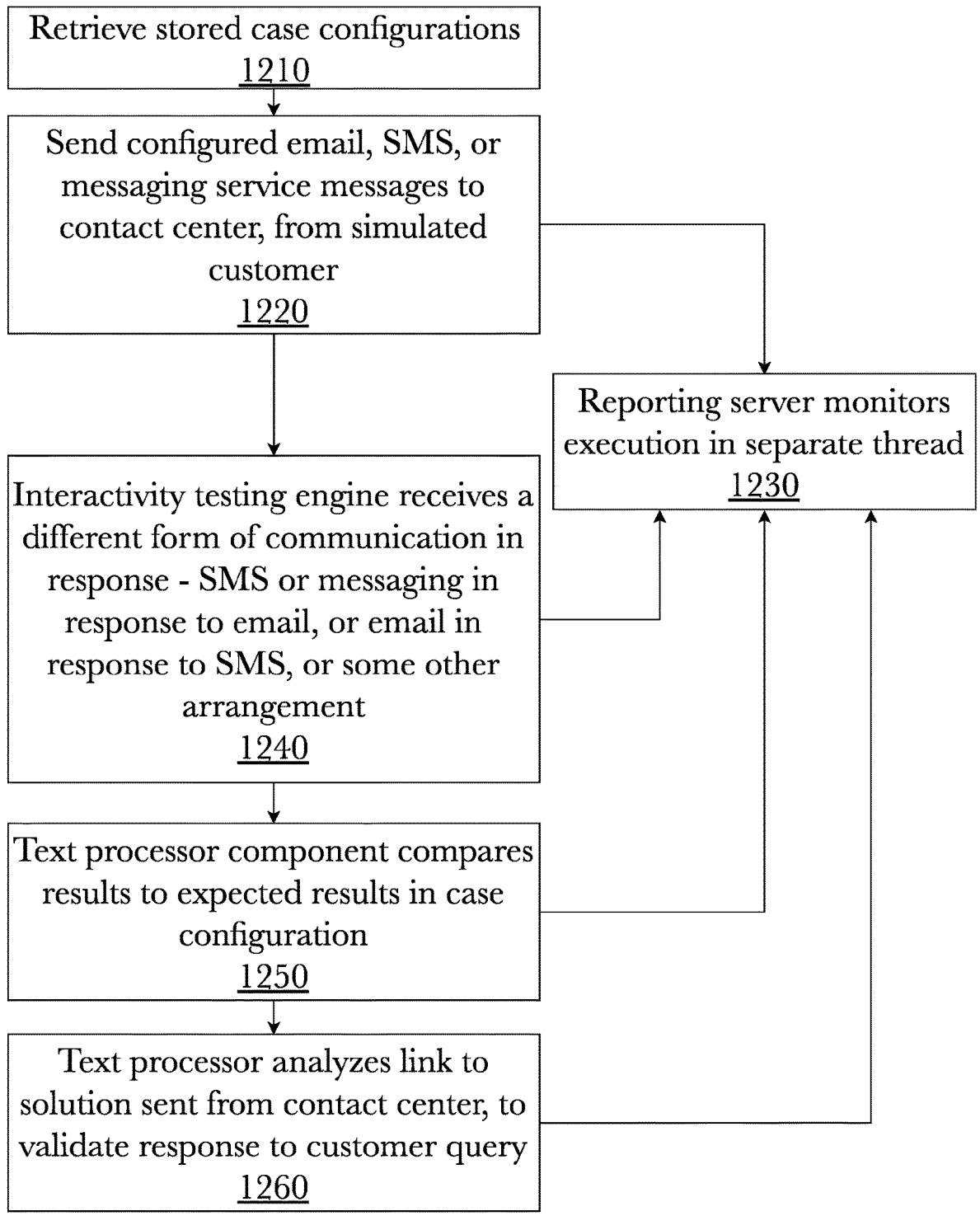
FIG. 12 is a method diagram for multi-modal text communications testing including email, SMS, and messaging testing of a contact center's automated responses, where a query and received response are of different communication formats.

FIG. 12 is a method diagram for multi-modal text communications testing including email, SMS, and messaging testing of a contact center's automated responses, where a query and received response are of different communication formats. Stored case configurations must first be retrieved if they are available 1210, from a testing database 812, by a text processor 920 component of a interactivity testing engine 811. Such testing configurations represent forms of text-based communications that are known and able to be automatically tested with, for example specific email or SMS forms which may be analyzed for specific contents if their general configuration is known, for processing and formulating automatic replies to test a contact center's system 1220. In this embodiment, the initial message to a contact center is in one form of text-based communication, and the response from the contact center is in a different form than the initial message (for example, a contact center replying to an email from a simulated or real customer with an SMS response containing a link to a solution) may be received from the contact center by a interactivity testing engine 811, 1240, after which a text processor 920 compares the received response to the expected response as stored in the testing database 1250, 812. According to this method, a link may be sent containing helpful information or a solution, or some other response to a customer, by a contact center, at which point a text processor will attempt to validate the link and ensure it follows the tested configuration of automated responses from the contact center 1260. It is not necessarily required that the text processor analyze the actual contents of the link fully or even partially, provided the link merely is properly formatted and is expected in the first place in the tested configuration. Continuously after sending an initial communication to a contact center 1220 and at every progressive step in the method, a reporting server 815 monitors the execution and progress of the integration testing 1230, reporting to an administrative interface 814 any software errors, errors in the testing itself, errors in received responses from a contact center, or even successful testing results and the configurations used in such tests, for a human user to examine if necessary.

Figure 13:
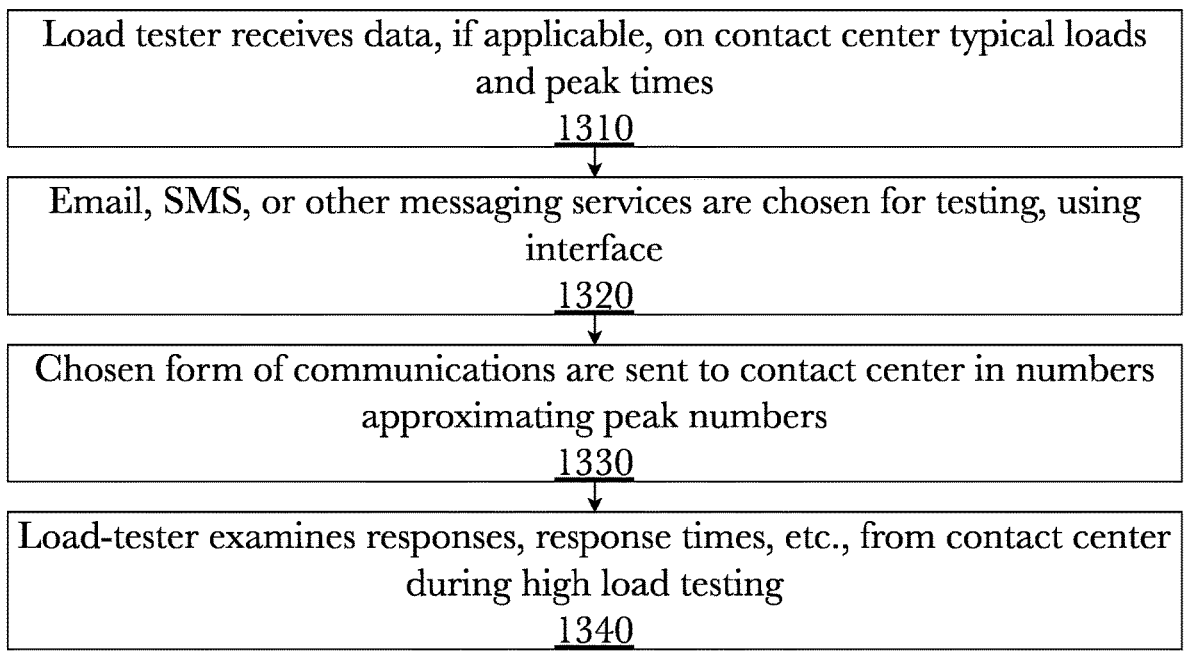
FIG. 13 is a method diagram for load testing of a contact center using a large load of text communications such as email queries.

FIG. 13 is a method diagram for load testing of a contact center using a large load of text communications such as email queries. A load tester may receive data from either a testing database 812 or a contact center directly, regarding the contact center's text communications peak hours, and how active the communications channels are during these times 1310. A load tester 930 may then determine with a testing database 812, whether to test email capacity, SMS capacity, or some other text communications capacity of a contact center 1320, or it may be determined by a user of an administrative interface 814 manually. The chosen form of communication, following a configuration stored in a testing database 812 which should be properly received and responded to by a contact center, may then be sent in large quantities matching or exceeding those of the center's peak hours 1330, depending on whether the center is being tested for current peak times or being stress tested for volumes exceeding current peak times. During the sending of such large numbers of communications 1330, the load tester examines the response time, response quality and accuracy, changes in response times, and other relevant data, from a contact center during and after the testing 1340, such data being available through a reporting server to an administrative interface 814 for examination by a system user.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
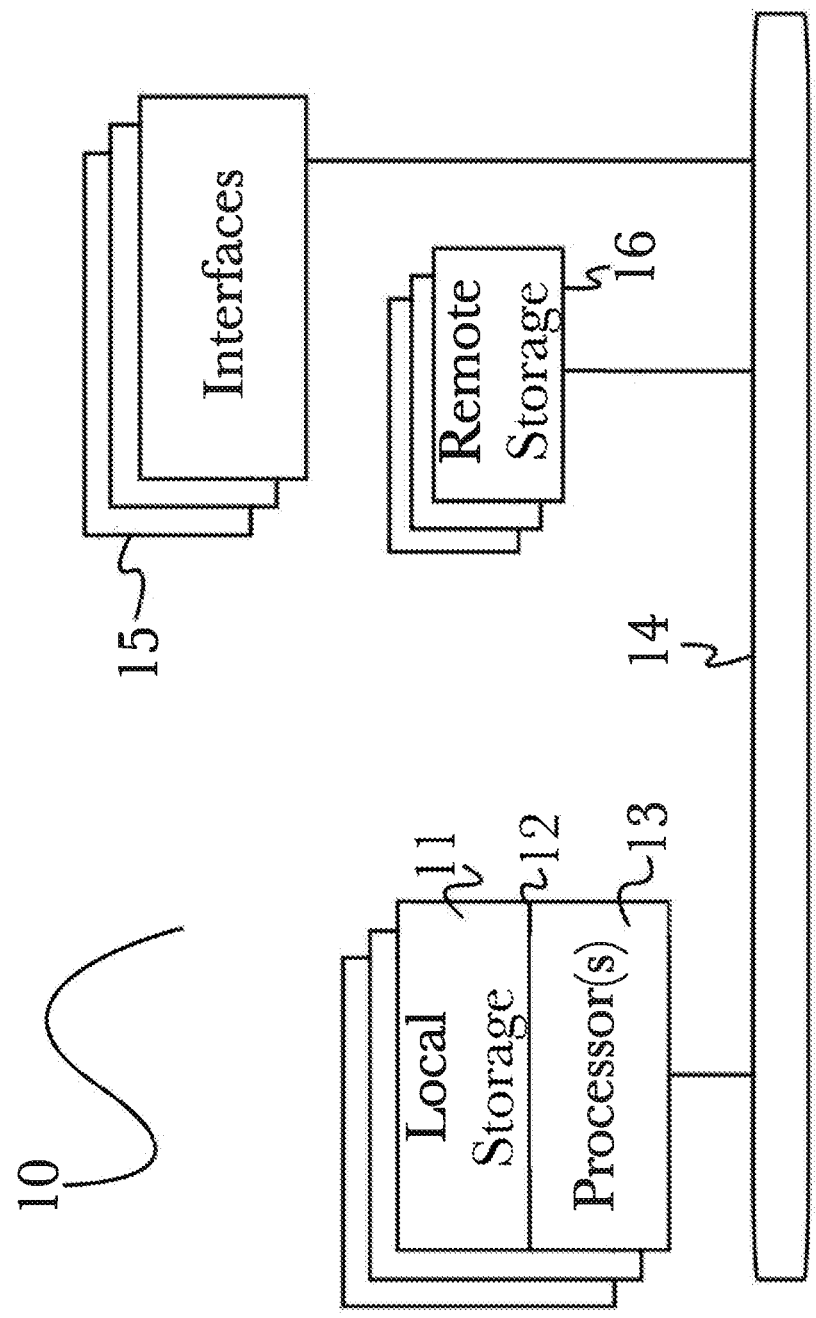
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
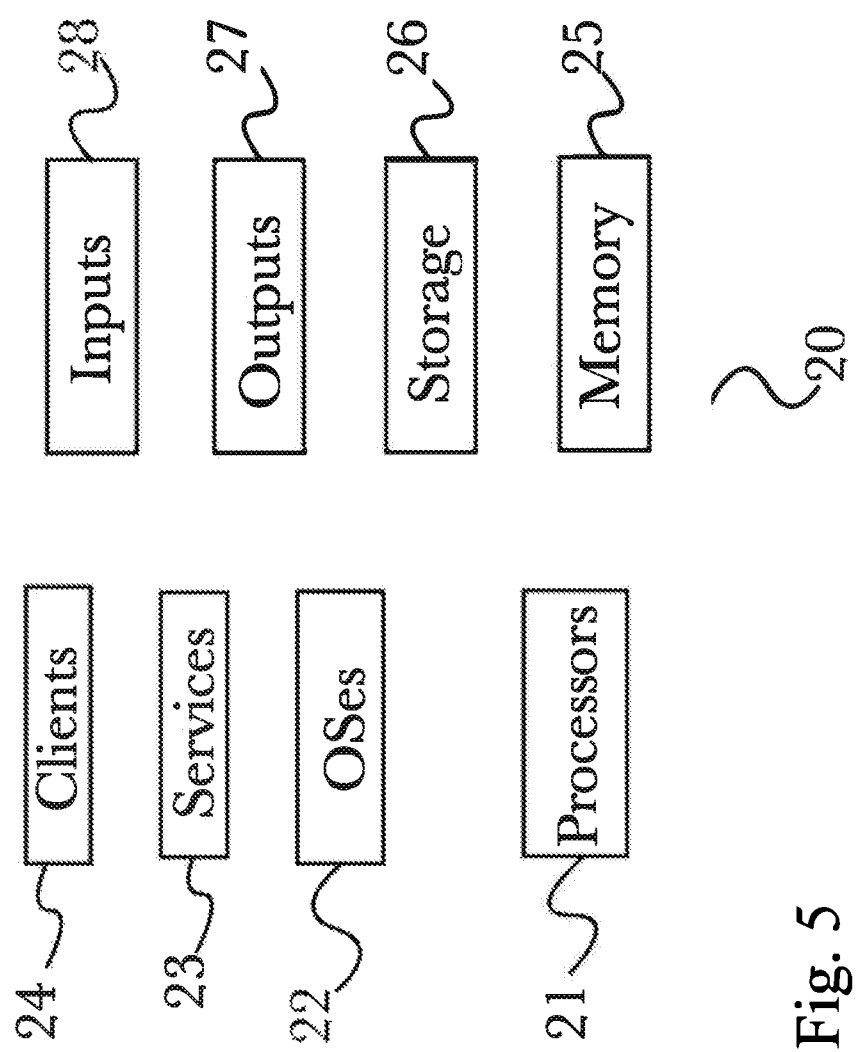
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
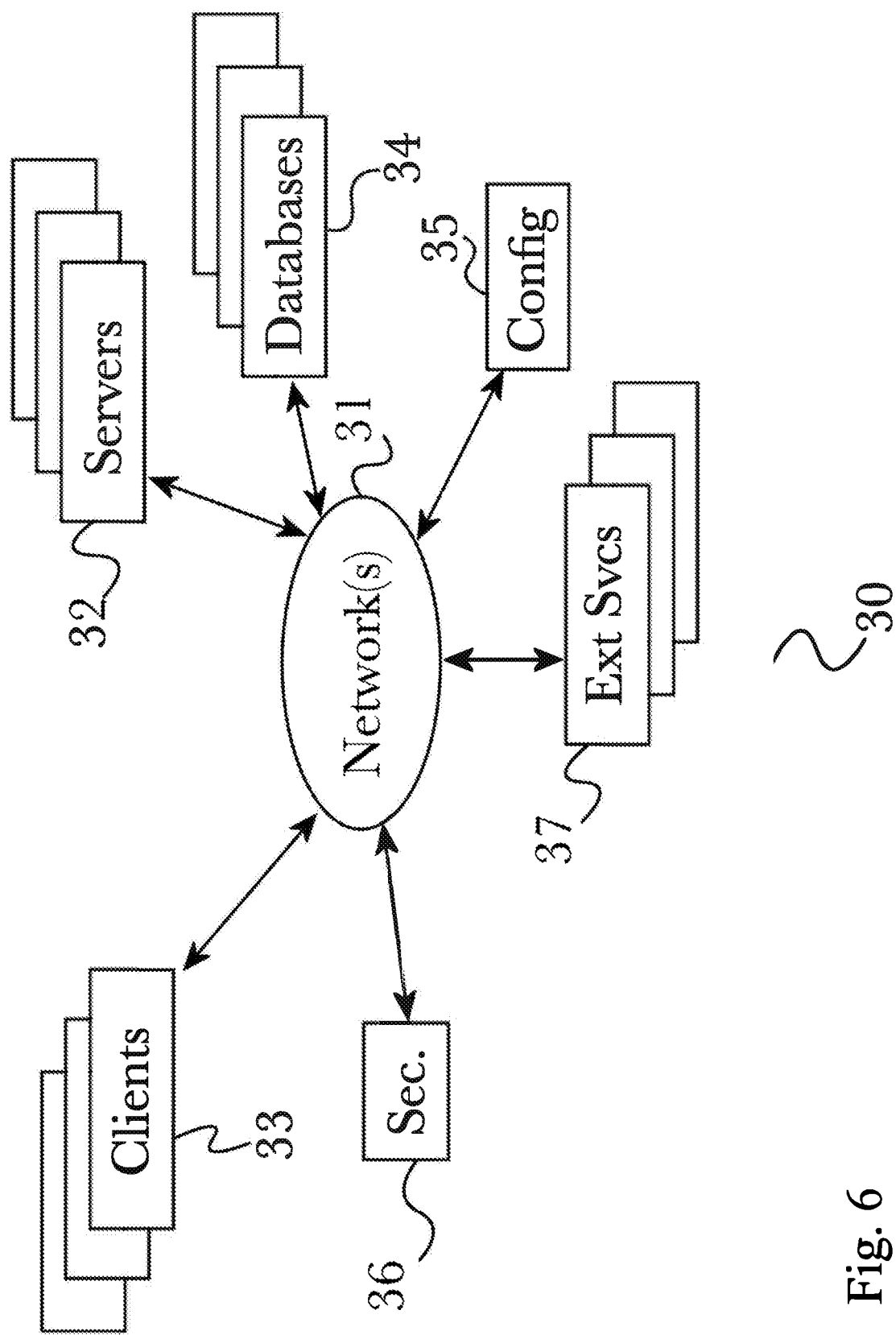
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
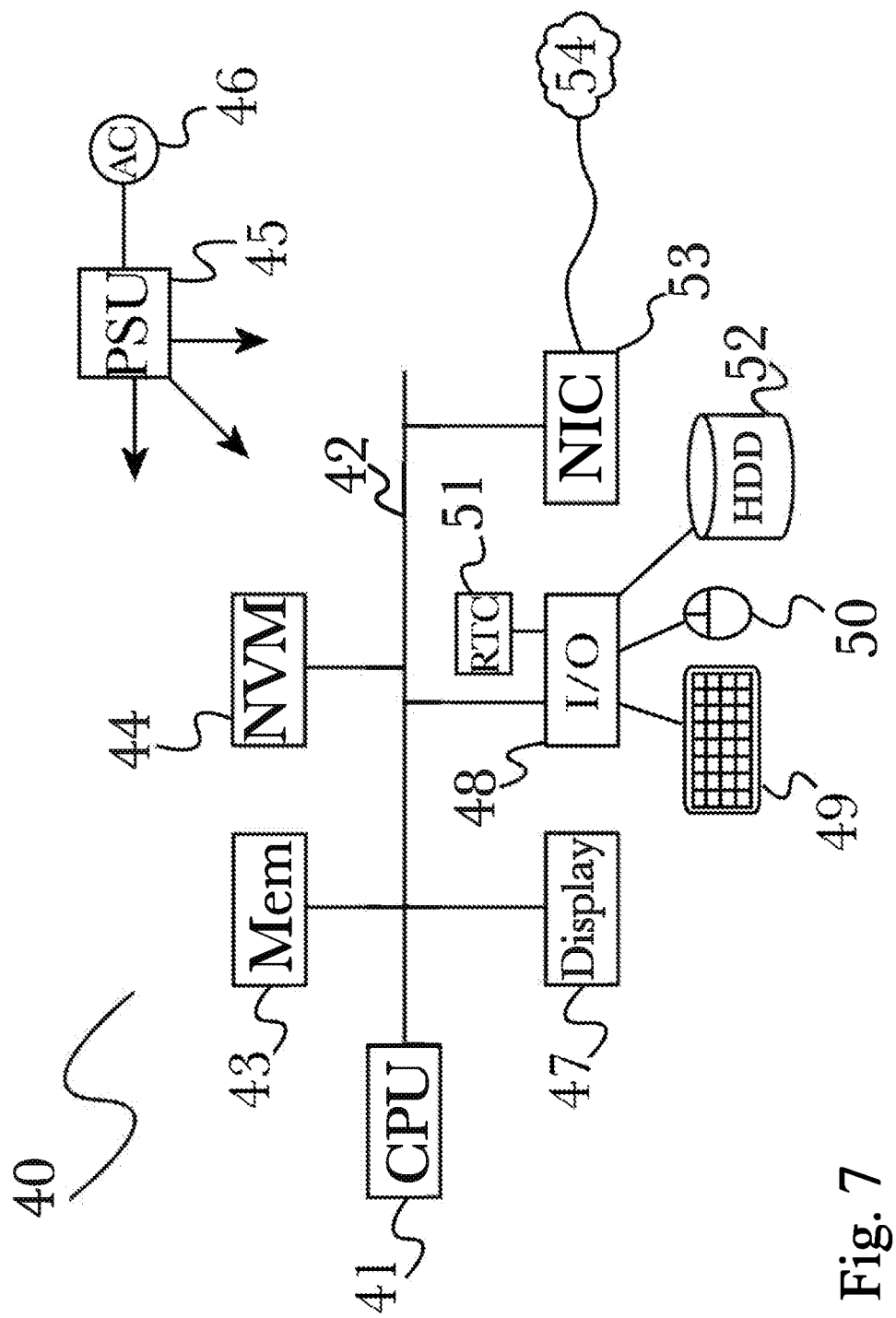
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for interactivity testing of text-based contact center communications, comprising:
    an interactivity testing engine comprising a first plurality of programming instructions stored in the memory of, and operating on a processor of, a computing device, wherein the first plurality of programming instructions, when operating on the processor, causes the computing device to:
    send a query from a test configuration to a contact center in each form of text-based communication supported by the contact center;
    receive a response from the contact center for each query sent in the same form of text-based communication as the query;
    compare each query and its response using one or more parameters to determine whether the response was appropriate to the query; and
    report an outcome of each comparison; and
    a load testing engine comprising a second plurality of programming instructions stored in the memory of, and operating on a processor of, the computing device, wherein the second plurality of programming instructions, when operating on the processor, cause the computing device to:
    receive an input comprising an expected text-based communication load capacity for each form of text-based communication at the contact center;
    send a quantity of text-based queries from the test configuration to the contact center in each form of text-based communication supported by the contact center;
    receive responses from the contact center for each query sent in the same form of text-based communication as the query;
    analyze and determine the performance and speed with which responses are sent from the contact center under large or increasing loads; and
    report the results of the analysis.

2. The system of claim 1, wherein the test database and interactivity testing engine are on separate computing devices, communicating over a network.

3. The system of claim 1, wherein the test database and interactivity testing engine are co-located on the same computing device.

4. A system for interactivity testing of two-factor authentication in text-based contact center communications, comprising:
    an interactivity testing engine comprising a first plurality of programming instructions stored in the memory of, and operating on a processor of, a computing device, wherein the first plurality of programming instructions, when operating on the processor, causes the computing device to:
    send a query from a test configuration to a contact center in each form of text-based communication supported by the contact center;
    receive a response from the contact center for each query in a different form of text-based communication from the form of text-based communication of the query, the response comprising an authentication code;
    extract the authentication code from the response;
    enter the authentication code in a text-based field at an authentication code prompt on a first web page;
    determine whether the login was successful by scanning the contents of a second web page that appears after entering the authentication code on the first web page; and
    report an outcome of the determination of whether the login was successful; and
    a load testing engine comprising a second plurality of programming instructions stored in the memory of, and operating on a processor of, the computing device, wherein the second plurality of programming instructions, when operating on the processor, causes the computing device to:
    send large quantities of a query from the test configuration to the contact center in each form of text-based communication supported by the contact center;
    receive responses from the contact center for each query in a different form of text-based communication from the form of text-based communication of the query, the response comprising an authentication code;
    analyze and determine the performance and speed with which authentication code responses are sent from the contact center under large or increasing loads;
    analyze and determine the performance and speed with which authentication code authentications are validated or rejected under large or increasing loads; and
    report the results of the analyses.

5. The system of claim 4, wherein the test database and interactivity testing engine are on separate computing devices, communicating over a network.

6. The system of claim 4, wherein the test database and interactivity testing engine are co-located on the same computing device.

* * * * *